April 7, 1959 G. C. ABBOTT 2,880,868
ARTICLE SELECTING, REJECTING AND MEASURING APPARATUS
Filed June 11, 1954 3 Sheets-Sheet 1
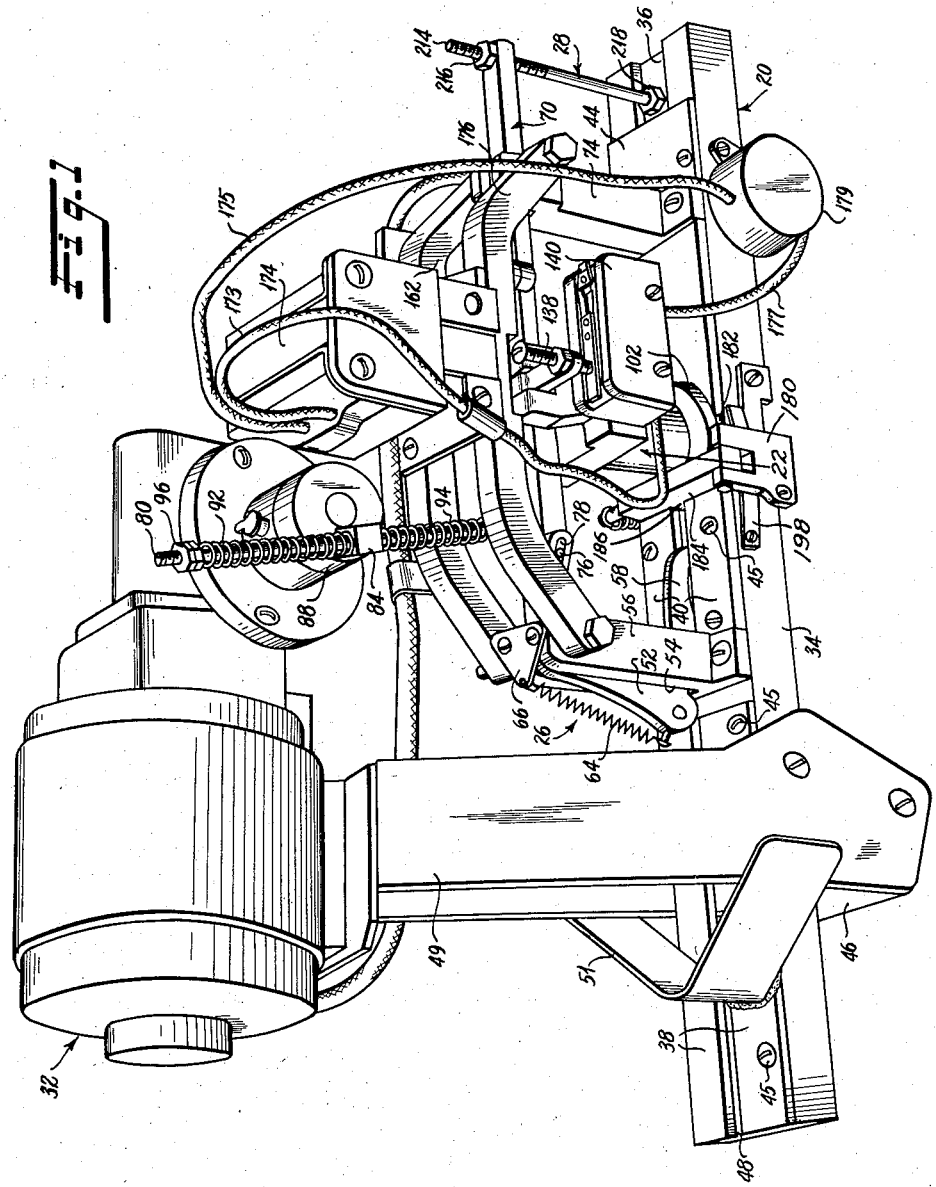
INVENTOR
GAIL C. ABBOTT
BY *Strauch, Nolan & Diggins*
ATTORNEYS

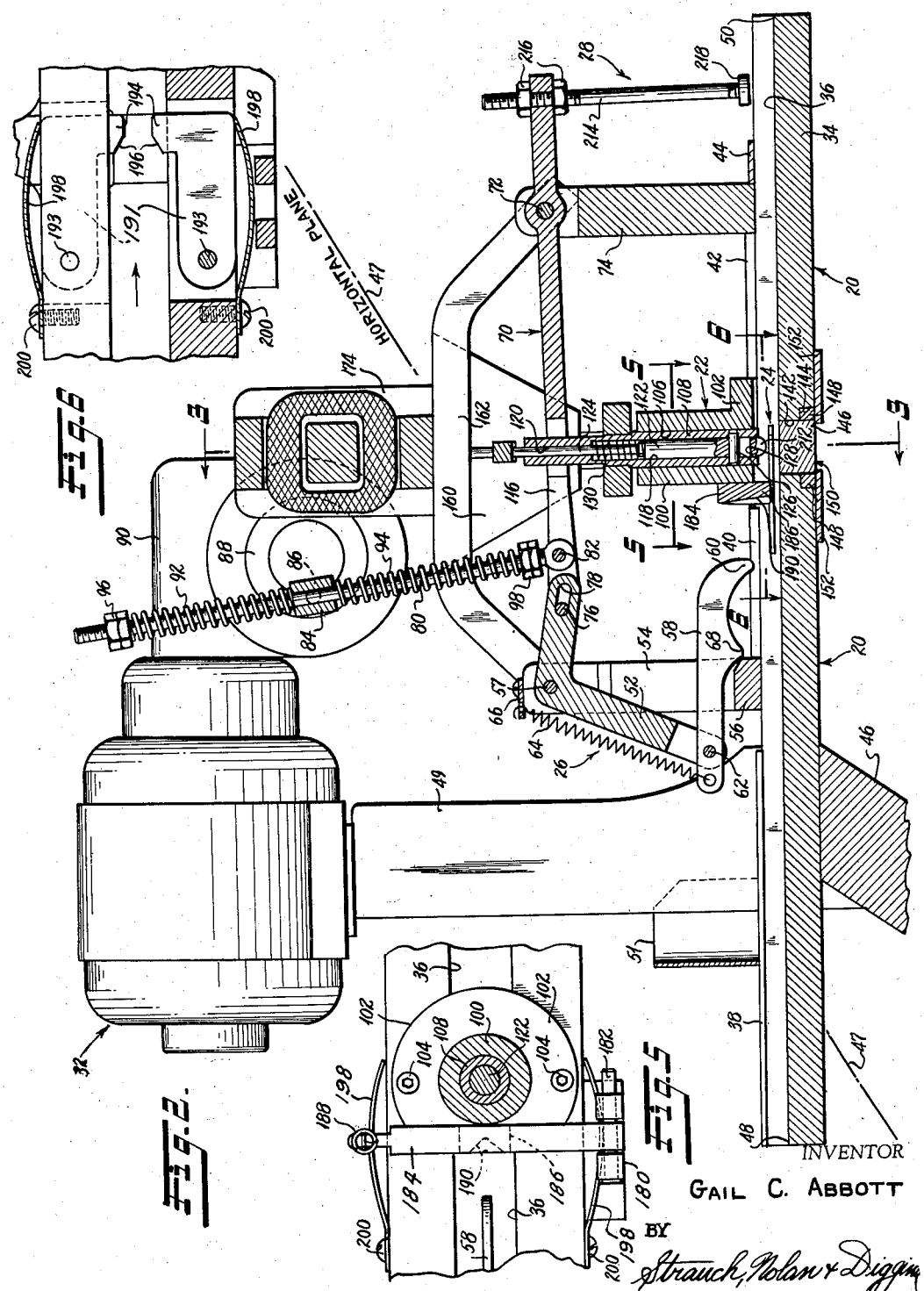

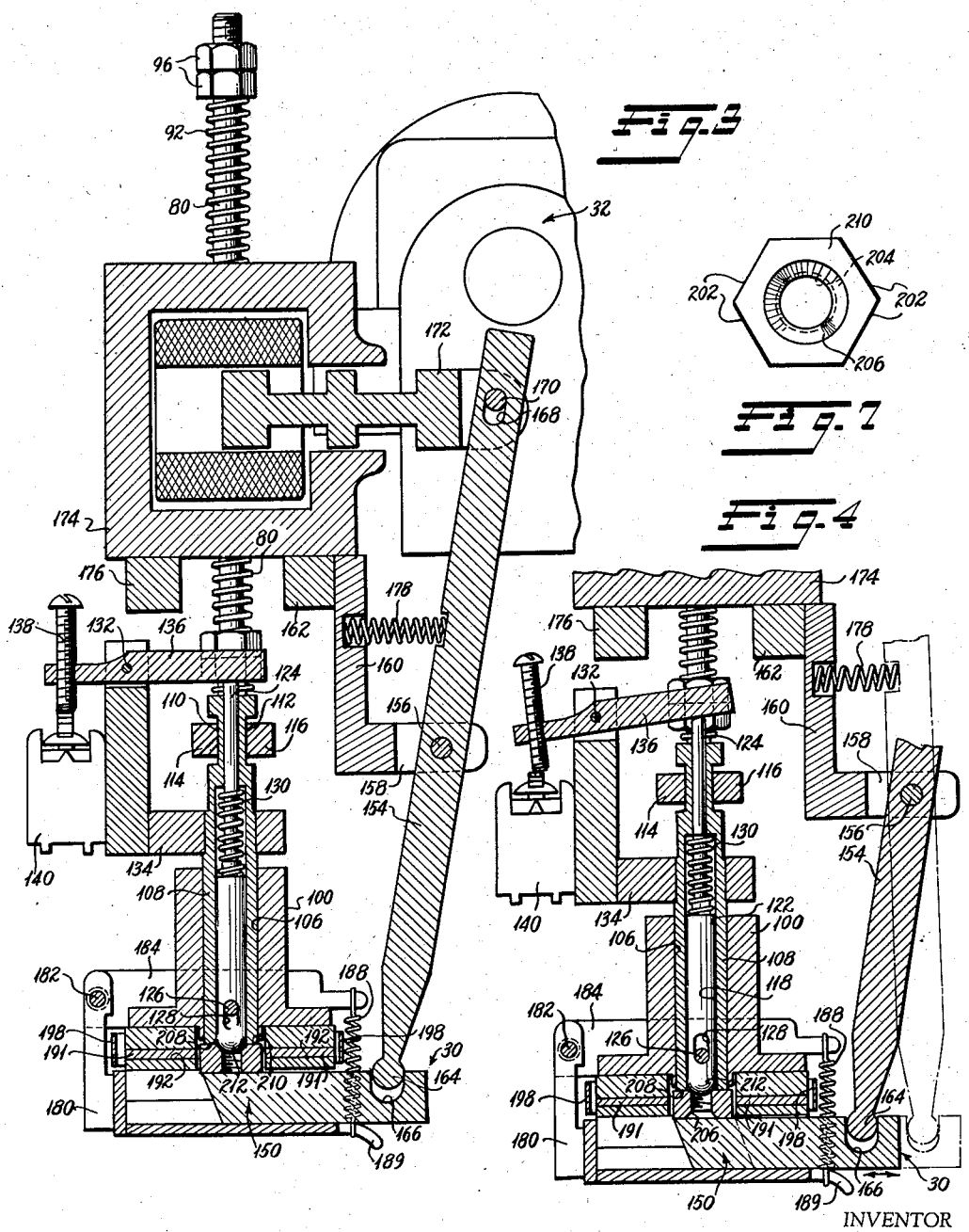

United States Patent Office 2,880,868
Patented Apr. 7, 1959

2,880,868

ARTICLE SELECTING, REJECTING AND MEASURING APPARATUS

Gail C. Abbott, South Whitley, Ind., assignor to Grip Nut Company, South Whitley, Ind., a corporation of Illinois Application June 11, 1954, Serial No. 436,101

5 Claims. (Cl. 209—72)

This invention relates to apparatus for sorting, selecting and rejecting articles and more particularly to apparatus for sorting, selecting and rejecting articles having at least one irregular surface.

While the invention is of general application, for purposes of the present disclosure it will be described and illustrated in connection with the sorting, selecting and rejecting of nuts and like articles having a central bore one end of which is counterbored or otherwise enlarged.

In the manufacture of nuts of this type the nut blanks are internally threaded, counterbored at one end and subsequently fed to a separate deflector mechanism to deform one surface to distort certain of the formed threads to give the nut locking characteristics. It is essential that the partially formed nuts be delivered to the deflector mechanism in predetermined position to prevent damage to the nuts and possible damage to the deflector mechanism. Since the nuts are delivered to a hopper in random position from the previous machining operation, provision must be made for delivering to the input conveyor of the deflector only those nuts which are properly oriented and it is the primary purpose and object of the present invention to provide improved means for accomplishing this objective.

It is a further object of the present invention to provide novel selecting, sorting and rejecting means for returning rejected articles to a source of supply.

It is a further object to provide improved article selecting mechanisms including means to maintain a desired delivery rate despite a varying incidence of rejection thus permitting synchronization of the mechanism with the capacity of the mechanism to which the selected articles are delivered.

It is an additional object of the present invention to provide improved article selecting means in which the delivery rate into the succeeding operation is controlled automatically and means are provided for rendering the selecting means inoperative if the delivery rate exceeds the capacity of the apparatus to which the articles are fed.

It is also an object of the present invention to provide improved article selector mechanisms having a selector or gauging station and means for positively positioning articles at said station.

It is another object of the present invention to provide improved article selector mechanisms in which provision is made for accommodating improperly manufactured or positioned articles without damage to the mechanism.

It is also an object of the invention to provide novel selecting mechanisms of simple inexpensive and durable construction.

It is a further object of the present invention considered in its broader aspects to provide novel mechanisms for selecting or measuring articles on the basis of the relation of two or more portions of one surface of the article.

It is also an object of the present invention to provide novel selecting mechanisms which select or measure articles on the basis of the configuration of one surface independently of the size of the article and specifically independently of the distance between the surface which forms the basis of the selection and the opposite surface.

Other objects will become apparent from a consideration of the following description taken in connection with the appended claims and the annexed drawings in which:

Figure 1 is a perspective view of a typical apparatus embodying the present invention;

Figure 2 is a vertical central section with parts in elevation of the apparatus of Figure 1;

Figure 3 is an enlarged transverse vertical section taken along line 3—3 of Figure 2;

Figure 4 is an enlarged fragmentary view similar to Figure 3 showing certain of the parts in a different operating position;

Figures 5 and 6 are fragmentary horizontal sectional views taken along lines 5—5 and 6—6 respectively of Figure 2 showing details of construction; and Fig. 7 is an enlarged plan view of a nut which the apparatus of the present invention is particularly adapted to handle.

Referring now more particularly to the drawings the principal components of the mechanism thereshown are the work chute indicated generally at 20, the gauging mechanism 22 positioned on the work chute at a gauging station indicated at 24, the work feeding mechanism 26, the work delivery control mechanism 28, the ejecting mechanism 30, the movable components of these elements being driven in timed relation by a motor 32 through mechanisms described in detail hereinafter.

The chute 20, which forms the rigid base upon which all of the remaining components of the apparatus are mounted, is preferably constructed of a single piece of bar stock 34 having a central upwardly opening groove 36 extending from end to end thereof. The top of the groove is partially closed by pairs of spaced cover plates 38, 40 and cover plates 42 and 44 attached to the upper surface of the chute as by screws 45. The groove 36 is preferably so proportioned that a nut of standard size may pass freely through it with slight lateral and vertical clearance. Rigidly secured to the lower side of the chute member 34 is a mounting bracket 46 adapted to be attached to a machine or other suitable supporting structure to incline the chute with reference to the horizontal indicated by reference line 47 so that nuts delivered to the upper end 48 of the work chute are urged by gravity toward the gauging station 24 thence toward the lower end of the chute 50. A shield 51 is attached to the upper end of the chute to prevent the passage of units into the machine except through the chute. Also attached to the bracket 46 are a pair of vertically extending motor brackets 49 to the upper ends of which the motor 32 is rigidly secured.

The mechanism 26 for augmenting the gravity feed of the nuts and for positively urging the nuts into the gauging station 24 includes a bell crank 52 received in a slot 54 in a feeder column bracket 56 mounted on the upper surface of the chute 34 and pivotally supported therein on a pin 57. A feeder arm 58 having a downwardly projecting nose portion 60 adapted to extend between the cover plates 40 into the groove 36 is pivotally attached as at 62 in the lower bifurcated end of one arm of the bell crank 52. A tension spring 64 extends between a retainer 66 and one end of the feeder arm 58 to urge the latter in a clockwise direction about the pivot 62 as viewed in Figures 1 and 2. Movement in this direction is limited by contact of a projection 68 on the feeder arm with the base of the bracket 56 so that the nose portion 60 of the feeder in normally disposed above the level of the groove 36.

The bell crank 52 is operated by a lever 70 mounted for pivotal movement on a pin 72 in the bifurcated upper end of an upstanding bracket 74 mounted on the upper surface of chute 34. The lever 70 is operatively connected to one arm of the bell crank by a pin 76 mounted on the former received in a slot 78 in the latter.

The lever 70 is adapted to be oscillated about the pin 72 by a rod 80 pivotally connected to the lever 70 at its lower end by a pin 82. The rod 80 is slidably received in a crank drive pin 84 pivotally mounted as at 86 on a drive wheel 88 adapted to be driven by the motor 32 through a reduction gear mechanism 90 of conventional construction. The motion of the crank pin 84 is resiliently transmitted to the rod 80 through springs 92 and 94 compressed between the upper and lower surfaces respectively of the crank pin 84 and lock nut sets 96 and 98 adjustably positioned on the rod adjacent the upper and lower ends thereof, respectively.

The selector mechanism 22 to which the unique effectiveness and many of the advantages of the present invention may be attributed, includes a tubular housing 100 having a lower flange 102 secured to the upper surface of the chute 34 by means of bolts 104 (Figure 5). Reciprocably received within a central machined bore 106 in housing 100 is a circular feeler element 108, the upper end of which is provided with a pair of grooves 110 and 112 (Figure 3) in which the spaced arms 114 and 116 of the lever 70 are received. Thus the oscillation of the lever 70 reciprocates the feeler element 108 within the bore 106. Reciprocably received within central bores 118 and 120 of the feeler element are a pilot 122 and a pilot pin 124 respectively, the latter being threaded into or otherwise secured to the former. A feeler pin 126 mounted in the feeler element 108 extends through a slot 128 formed adjacent the lower end of the pilot to limit relative movement between the feeler and pilot elements. The upper end of the slot 128 is normally held against the pin 126 by a compression spring 130 coiled between the upper end of bore 118 and a shoulder formed on the pilot 122.

Pivotally mounted as at 132 on a bracket 134 encircling and rigidly secured to the feeler element 108 is a lever 136, one end of which is adapted to rest on the upper end of the pilot pin 124. An actuating pin 138 is adjustably threaded into the opposite end of the lever 136 and projects downwardly into engagement with the operating element of a normally open microswitch 140 secured to the bracket 134. Actuation of the switch 140 is adapted to operate the ejecting mechanism as more fully appears hereinafter. Thus it will be seen that displacement of lever 136 about pin 132 and consequent actuation of switch 140 occurs only upon relative movement between the pilot pin 124 and the feeler element 108.

Directly below the pilot and feeler assembly the chute 34 is provided with a downwardly open transverse slot 142 enlarged at 144 in which the main body 146 and guide members 148 of a nut release member 150 are respectively slidably received. The member 150 is supported for reciprocation within the grooves in the chute member 34 by lower cover plates 152 secured to the lower surface of the chute 34 by any suitable means, not shown. The position of the release member 150 is controlled by a lever 154 (Figure 3) mounted for pivotal movement on a pin 156 positioned in the bifurcated portion 158 of a bracket 160 rigidly secured to a bridge member 162 secured to and extending between the upper ends of the backets 56 and 74. The lower end of the lever 154 carries an integral cylindrical projection 164 received within a slot 166. The upper end of the lever 154 is slotted as at 168 to receive a pin 170 carried in the bifurcated end of the armature 172 of a solenoid 174 rigidly supported on the bridge member 162 and a similar bridge member 176. The solenoid 174 is connected to a power circuit including leads 173, 175, 177, the normally open switch 140 and a connector plug 179. Accordingly, the solenoid is energized only when switch 140 is closed.

A compression spring 178 is compressed between the bracket 160 and the lever 154 to urge the lever clockwise about the pin 156 to maintain the release member 150 in the position shown in Figure 3. However when the solenoid 174 is energized by actuation of switch 140, the lever 154 and the release member 150 move to the dotted line position shown in Figure 4 so that a nut positioned at the gauging station 24 may drop freely through the bottom of the chute. Movement of the member 150 to the left, as viewed in Figure 3, into work supporting position under the influence of spring 178 is limited by contact of the end of the guide members 148 with the base of a bracket 180 secured by suitable means to the front side of chute member 34 across the end of the grooves 142 and 144.

Pivotally supported on a pin 182 extending through the upstanding bifurcated portion of the bracket 180 is a nut friction member 184 which extends transversely across the top of the chute and is provided with a central downwardly extending projection 186 adapted to fit within the groove 36 and frictionally engage the tops of the nuts as they pass through the mechanism. The projection 186 is resiliently urged against the top surface of the nuts by a tension spring 188 attached to the free end of the member 184 and to a projecting arm 189 of one of the lower cover members 152. The rearward side of the projection 186 is cut away centrally as at 190 to accommodate the full stroke of the feeder member 58.

By virtue of this friction control only those nuts which are positively urged toward the gauging station 24 by the feeder mechanism 26 are permitted to pass beneath the friction stop 186.

To positively position the nuts at the gauging station beneath the pilot and feeler assembly, positioning fingers 191 are provided which are mounted in slots 192 in the front and rear side walls of the chute member 34 and are secured therein on pins 193. The positioning fingers are each provided with projections 194 having positioning faces 196 adapted to engage faces of a nut correctly positioned at the gauging station 24. The fingers 191 are urged to the position shown by resilient steel spring fingers 198 secured to the front and rear side walls of the chute as by screws 200. The spring fingers 198 are of sufficient width to engage the side of the chute above and below the slots 192 in which the fingers 191 are positioned so that they are effective merely to urge the rearward faces of the fingers 191 to a position flush with the respective side surfaces of the chute and the fingers 191 are so dimensioned that in this position the faces 196 occupy the proper position.

It is to be understood that as succeeding blanks are positively fed by the mechanism 26 the springs 198 permit the fingers 191 to spread apart to permit the passage of a nut held at the gauging station to the lower end of the chute.

The operation of the mechanism thus far disclosed will now be described in connection with the selection and rejection of nuts of the type shown in Figure 7, an operation in which the present apparatus has particular utility. Nuts of this kind are ordinarily hexagonal, having side faces 202. The nut also has a central threaded section 204 terminating at one end in a counterbore 206. The operation of the mechanism will be described assuming that the nuts are delivered to the upper end 48 of the work chute in random fashion from a hopper and are to be delivered through the lower end 50 of the chute only if the nut is so positioned as to dispose the counterbore 206 on the top of the nut as shown in Figure 3. The feeler and pilot are so proportioned that when the nuts are properly positioned the lower annular end surface 208 of the feeler engages the annular upper surface 210 of the nut at the same time that the lower rounded end surface 212 of the pilot 122 engages the counterbore 206 of the nut if the upper end of the slot 128 is engaged with pin 126. Alternately, the parts may be so proportioned that the pilot does not normally contact the counterbore.

Nuts delivered to the upper end 48 of the chute by any conventional delivery mechanism, not shown, will pass by gravity toward the stop 186 whether or not the selector mechanism is in operation. When the selector mechanism is placed in operation, the feeder arm 58 will be reciprocated and the nose 60 of the feeder arm will drop into the bore of a nut in the chute 34 urging the nut positioned against the stop 186 past the stop into engagement with the positioning faces 196 of the fingers 191. The components of the feeding mechanism 26 are so proportioned that the stroke of the member 58 as compared with the lateral dimensions of the nut is sufficient to position the nut accurately at the gauging station. On the return stroke the nose 60 is withdrawn from the bore of the nut, the weight of the nuts in the chute being sufficient to prevent their movement toward the upper end of the chute. It is to be noted that during the forward stroke of the feeder arm 58 the pilot 122 and the feeler 108 are raised by the lever 70. During the retraction stroke of the feed member 58 the feeler and pilot are moved downwardly into engagement with the upper surfaces of the nut. If the nut is properly positioned as shown in Figure 3 the pilot feeler assembly is moved downwardly so that the lower end surface 208 of the feeler engages the upper surface 210 of the nut simultaneously with the engagement of the lower end surface 212 of the pilot with the counterbore 206 of the nut. However, as stated above the parts may be proportioned so that the pilot does not contact the nut counterbore. While the parts are ordinarily so proportioned that this action takes place when the lever 70 is at the bottom of its stroke, this is not necessary because of the yielding connection between the crank pin 84 and the lever 70. Assuming the nut to be in correct position, continued rotation of the crank 88 lifts the pilot feeler assembly and moves the feeder arm 58 through another feeding stroke to position the next succeeding nut at the gauging station 24. This operation continues without interruption so long as the nuts are properly positioned and the lower end of the chute is free.

If an improperly positioned nut is delivered to the work gauging station 24 as shown in Figure 4 the lower end of the pilot engages the end of the bore 204 before the lower end of the feeler engages the bottom surface of the nut. Accordingly continued downward movement of the feeler produces relative upward movement of the pilot and pilot pin, compressing spring 130 and pivoting lever 136 to close the microswitch 140. Solenoid 174 is thus energized moving lever 154 counterclockwise about pin 156 and retracting the work release member 150. The unsupported nut is propelled both by gravity and by the action of compressed spring 130 out of the bottom of the chute into the hopper or return chute leading to the hopper, not shown. Ejection of the nut immediately permits the pilot to assume its normal position relative to the feeler, that is, with the top of the slot 128 engaging the pin 126. The switch 140 is permitted to open thus deenergizing the solenoid 174 and the work release member 150 is returned to its normal work supporting position by the action of spring 178.

The speed of the handling of the nuts may be adjusted by a motor rheostat so that the nuts can be sorted at a rate properly synchronized with the mechanism to which the properly positioned nuts are delivered at the lower end 50 of the chute. The speed of the mechanism is ordinarily established on the basis of the expected incidence of rejection. For example, in the present case since the mechanism selects the nuts on the basis of one of two random positions it may be expected that the incidence of rejection will be 50% and the speed of the machine is set accordingly. However the speed of the apparatus is selected so that if the incidence of rejection is actually 50% nuts will be delivered at a rate substantially exceeding the capacity of the next succeeding machine in order to assure delivery of nuts at a proper minimum speed if the incidence of rejection temporarily exceeds 50%. Accordingly under many circumstances the lower end of the chute will become filled with correctly positioned nuts and it is a feature of the invention that this does not interfere with the effective operation of the apparatus because of the action of the delivery control mechanism 28.

This mechanism, which despite its effectiveness, is extremely simple consists of a feed cut-off stud 214 adjustably threaded into the free end of lever 70. The stud may be locked in adjusted position by nuts 216. A head 218 is threaded on the lower end of the stud and is adapted to enter groove 36 upon reciprocation of lever 70. However if the lower end of the chute becomes filled with nuts, reciprocation of the stud 214 is prevented thus immobilizing lever 70 and rendering the feed mechanism 26 inoperative. It is to be noted that when lever 70 is immobilized by the action of the mechanism 28 the crank may continue to revolve without damage to the machine because of the resilient connection through springs 92 and 94 of the crank pin 84 and the lever 70. As soon as the lower chute becomes free the selection and feeding action of the mechanism is resumed.

It will be appreciated that while, in the illustrative embodiment herein disclosed, a relatively large relative movement of the pilot with respect to the feeler is produced by an improperly positioned article the mechanism may be rendered sensitive to very small movements of the pilot. The sensitivity of the mechanism can be varied by adjustment of the position of pin 138. If increased sensitivity is desired additional levers may be introduced between the pilot and the switch 140.

From the foregoing it will be apparent that the presently disclosed mechanism has attained the above stated objects and provides a mechanism which is extremely flexible and versatile in operation, which is relatively simple in construction, which is sensitive in operation and capable of easy adjustment to accommodate a wide range of operating conditions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for selecting from a series of articles those presenting a face having one portion offset a predetermined amount with respect to another portion, and for rejecting all others of said articles comprising, an article passage having a primary discharge opening for selected articles and a secondary opening therein for rejected articles, feeding means for moving said series of said articles through said article passage past a test position, said secondary opening and toward said primary discharge opening, a selector mechanism having a pair of normally offset article-engaging parts, said parts being mounted for axial selecting movement relative to each other during operation of said selector mechanism, resilient means biasing said parts toward a predetermined relative offset position, drive means for moving said selector parts in unison into and out of engagement with a presented face of an article at said test position, said parts engaging said presented face sequentially and thereby moving relatively axially when said presented face does not have portions offset said predetermined amount, a yieldable drive connection between said drive means and said selector mechanism acting in series with said resilient biasing means to permit the relative axial movement of said parts to be effected at any point in the article engaging movement of said selector mechanism when said parts sequentially engage said presented face, and means responsive to a predetermined relative axial selecting movement of said parts resulting from said sequential engagement to reject unselected articles.

2. In apparatus for selecting and delivering predetermined ones of a series of articles comprising, a chute having an inlet end and an outlet end through which said articles pass, a selector mechanism for removing certain of said articles from said chute between the inlet and outlet ends thereof, an operating lever mounted for pivotal movement about an axis transverse to the path of movement of said chute, drive means including a resilient drive connection for oscillating said lever about said axis, a feeding member carried by said operating lever and adapted, when said lever is oscillated, to project into said chute and move said articles positively toward said selector mechanism, and a cut-off member carried by said operating lever and movable by said operating lever in each oscillation thereof into and out of said chute between said selector mechanism and the outlet end of said chute whereby an article in the path of said cut-off member will prevent full movement of said cut-off member, said operating lever and said feeding member to thereby interrupt the flow of articles to said selector mechanism.

3. Apparatus for selecting and rejecting articles having a portion of one surface offset with respect to another portion of said surface comprising, a chute having an inlet end and an outlet end and an opening in a lower wall thereof between said inlet and outlet ends through which said articles may fall, a movable closure normally closing said opening, an operating lever mounted for pivotal movement about an axis transverse to the longitudinal axis of said chute, a selector mechanism carried by said lever adjacent said opening, a feeding member operably connected to said lever and adapted to extend into said chute adjacent the inlet end and contact articles therein, a motor operated drive wheel, a rod connected to said drive wheel and to said lever, at least one of the connections being resilient to yieldingly oscillate said lever, periodically reciprocate said feeding member to move a series of articles along said chute to a predetermined position adjacent said opening, and to move said selector mechanism into and out of contact with an article at said position, said selector mechanism having relatively movable normally axially offset parts adapted respectively to engage said portions of said one surface sequentially when said portions are not in predetermined relation, and means responsive to a predetermined relative movement between said parts resulting from said sequential engagement to move said closure means away from said opening to permit an article to drop from said chute.

4. The combination according to claim 3 together with a feed cut-off stud mounted on said operating lever and movable by said lever in each oscillation thereof into and out of said chute between said selector mechanism and the outlet end of said chute whereby an article in the path of said cut-off stud will prevent full movement of said stud, said lever and said feeding member to thereby interrupt the flow of articles to said selector mechanism.

5. Apparatus for transferring only those of a series of nuts or the like having a countersink at the upper end of a central bore and for rejecting all others of said nuts comprising, a chute having an opening in the lower wall thereof, movable closure means normally blocking said opening, feeding means for moving a series of said nuts through said chute toward said opening, a selector mechanism adjacent said opening, drive means for operating said feeding means and for moving said selector means toward and away from said opening along an axis substantially normal to the chute in timed relation with the movement of said nuts through said chute, a yieldable drive connection between said drive means and said selector mechanism and between said drive means and said feeding means to permit continued limited movement of the drive means after interruption of the movement of the selector mechanism or the feeding means, normally offset parts on said selector mechanism mounted for movement relative to each other along said axis during operation of said apparatus, resilient means biasing said parts toward a predetermined relative position, said offset parts being adapted respectively to engage the end of the nut at a first end portion adjacent to the bore and at a second end portion surrounding the first end portion sequentially when said countersink is not disposed at the upper end of said bore, and means responsive to a predetermined relative movement between said normally offset parts resulting from such sequential engagement to move said closure means away from said opening to permit a nut to drop from said chute.

References Cited in the file of this patent

UNITED STATES PATENTS

| | | |
|---|---|---|
| 1,424,370 | Morey | Aug. 1, 1922 |
| 1,650,278 | Kingsbury et al. | Nov. 22, 1927 |
| 2,390,012 | Timm et al. | Nov. 27, 1945 |
| 2,393,246 | Hallowell | Jan. 22, 1946 |
| 2,402,097 | Spraker | June 11, 1946 |
| 2,407,062 | Darrah | Sept. 3, 1946 |
| 2,505,468 | Forca | Apr. 25, 1950 |
| 2,699,868 | Bailey | Jan. 18, 1955 |